No. 865,632.
PATENTED SEPT. 10, 1907.
J. E. DAVIS.
ADJUSTABLE HOE.
APPLICATION FILED JAN. 29, 1907.
2 SHEETS—SHEET 1.
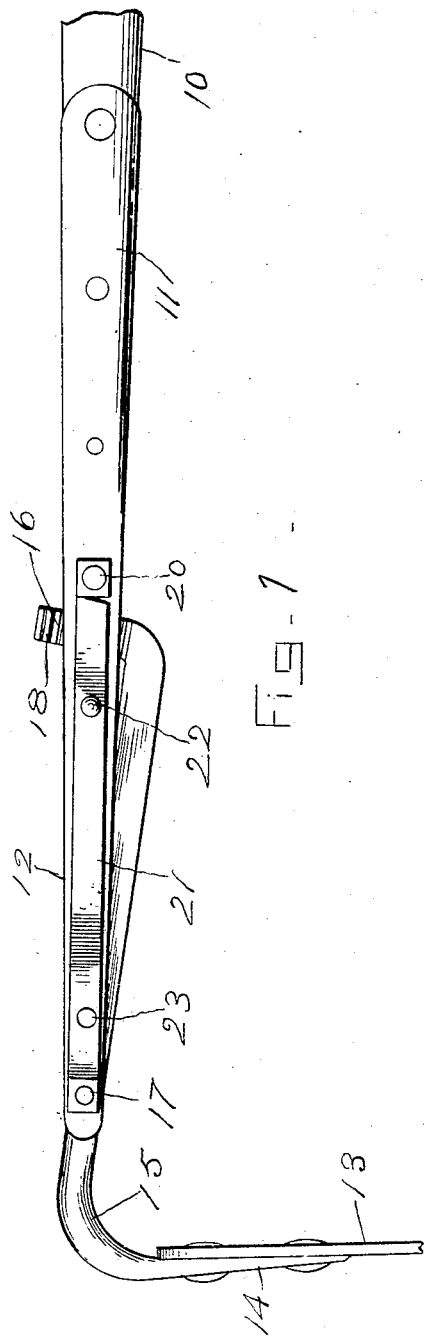
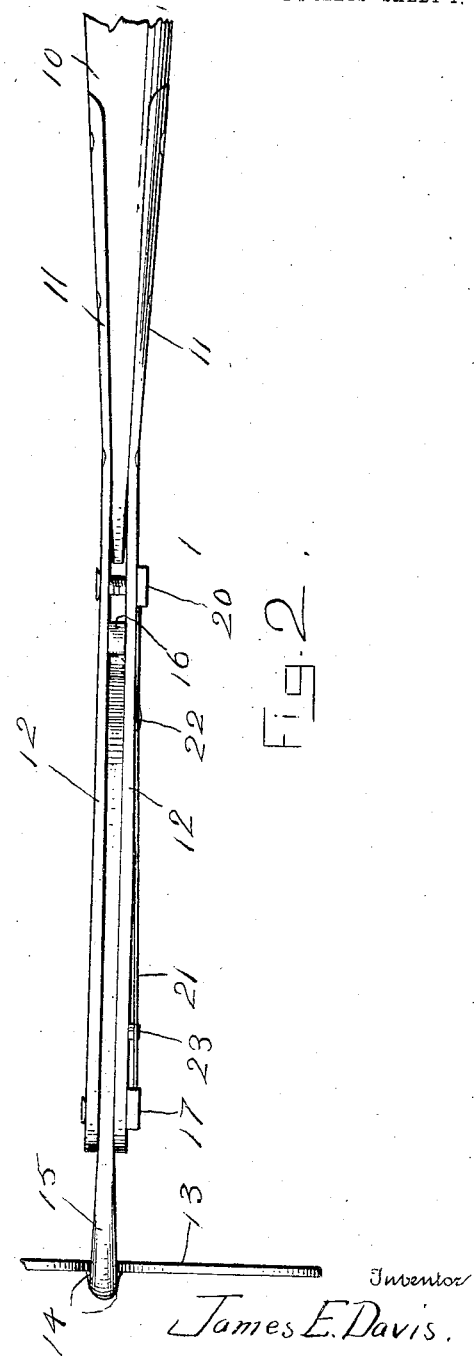
Inventor
James E. Davis.
Witnesses
By
Attorneys

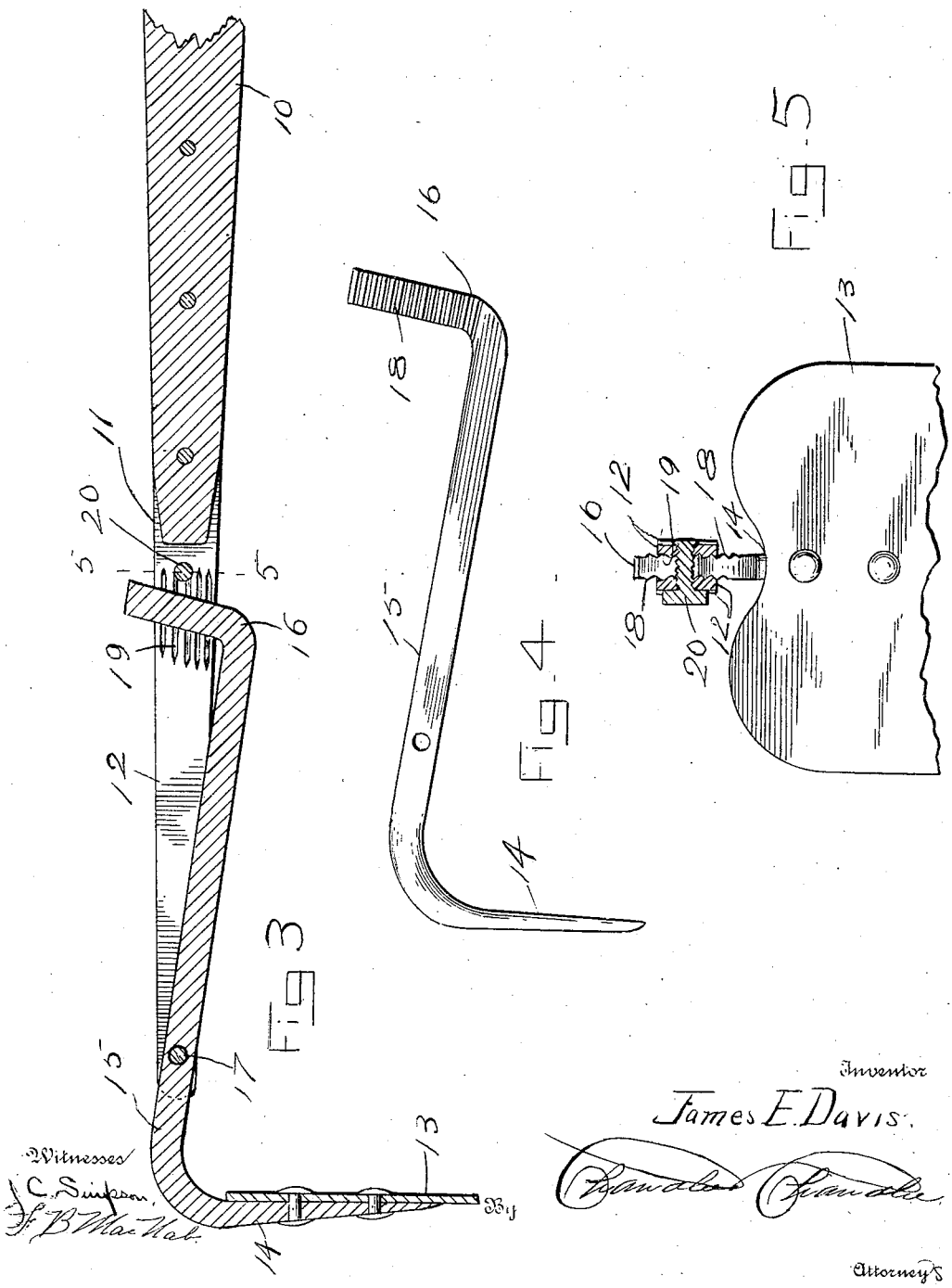

UNITED STATES PATENT OFFICE.

JAMES E. DAVIS, OF PLEASANT SHADE, TENNESSEE.

ADJUSTABLE HOE.

No. 865,632.　　　　Specification of Letters Patent.　　　　Patented Sept. 10, 1907.

Application filed January 29, 1907. Serial No. 354,670.

*To all whom it may concern:*

Be it known that I, JAMES E. DAVIS, a citizen of the United States, residing at Pleasant Shade, in the county of Smith, State of Tennessee, have invented certain new and useful Improvements in Adjustable Hoes; and I do hereby declare the following to be a full, clear, and exact description of the invention, such as will enable others skilled in the art to which it appertains to make and use the same.

This invention has relation to hoes that are made adjustable on their handles in order to vary the inclination of the hoe-blade with respect to the plane of the handle.

It is the object of the invention to provide improved means for securing the shank of the hoe adjustably on the handle and to lock it in any position to which it may be adjusted.

The nature of the invention may be ascertained from the device portrayed in the annexed drawing, forming a part of this specification, in view of which the improvements will first be fully described with respect to their construction and manner of operation and use, and then be pointed out in the subjoined claim.

Of the said drawing—Figure 1 is a side elevation of my improved adjustable hoe and a portion of its handle. Fig. 2 is a plan of the same. Fig. 3 is a longitudinal sectional view. Fig. 4 is a side elevation of the shank of the hoe detached. Fig. 5 is a transverse section in the plane 5—5, Fig. 1.

In the drawings 10 designates the hoe handle which on its lower end portion has the upper flattened end portions 11, of the extended spaced bars 12 riveted thereto on opposite sides thereof. The said flattened portions 11 are preferably of somewhat concave form on their inner surfaces to fit on the sides of the hoe-handle and convex in form on their outer surfaces to conform somewhat to the rounded part of the handle above.

13 designates the blade of the hoe that may be of any suitable form having the angular portion 14 of its shank 15 attached thereto in any known or suitable way. The shank 15 may extend at or nearly at a right angle to the plane of the blade and has its rearward end upturned as at 16 at substantially right angles to the plane of the shank proper. The forward part of the shank is secured between the forward ends of the space bars 12 on a bolt 17 which bolt is passed through the bars and the shank 15 forming a pivot for the latter. The angular end 16 of the shank is grooved on its opposite sides as at 18 and is extended up and between the bars 12 which are grooved on their inner sides, as at 19, conforming in shape and manner to the grooves 18 so that when said shank is clamped between the bars, as it may be, by the bolt 20 passing through the bars 12 just to the rear of the angular extension 16, it will be held in fixed position.

The shank of the bolts will be made square in cross section adjacent to their heads and the holes through which the said bolts pass will be of like form so as to assist in preventing the bolts from turning when screwed home.

21 designates a thin metal plate pivoted on a rivet 22 toward one end and snapped over the end of a rivet shank 23 at the other end, the ends of said plate resting against or nearly against the sides of the bolt locking the same against turning. The said plate will be of resilient character so that it may be sprung out from connection with its pivotal pin 23 and swung on the pivot 22 out of engagement with the bolt heads to permit the bolts to be removed or loosened, so that the shank 15 of the hoe may be adjusted through the medium of the forward pivot bolt and the ribbed or grooved angular part of the shank. After an adjustment is made as described, the bolts may be tightened and the plate 21 swung on its pivotal rivet and locked into position by causing the perforation through its forward part to engage the pivot rivet 23.

In the manner described, it will be noted that the hoe blade may be adjusted in any desired position with respect to the handle so as to suit a man of tall or short stature, or for any other means. It is to be also noted that the construction provides for interchanging one hoe for another having a different form or character of blade.

The locking strip 21 may be made of a resilient material that will not be liable to corrode, but under any circumstances, it is necessary that it should be of resilient character to permit of its performing the functions hereinbefore ascribed to it.

What is claimed is—

As an article of manufacture, an adjustable hoe comprising a handle having spaced bars extending from its lower end, the upper portions of the bar being secured to opposite sides of the handle, the hoe and its shank the latter having an upturned angular end ribbed and grooved on its sides and projecting between the bars the contacting sides being correspondingly ribbed and grooved, a headed bolt extending through the bars to the rear of the angular end of the shank to clamp the latter in position, a headed bolt extended through the forward ends of the bars and the shank, and a strip of resilient metal pivoted at one end on the side of one of the bars and secured at the other end on a pivot pin with its ends in contact with the heads of the bolt to keep them from turning.

In testimony whereof, I affix my signature, in presence of two witnesses.

JAMES E. DAVIS.

Witnesses:
　M. M. McDONALD,
　F. A. CLEVELAND.